(12) United States Patent
Rubinsztajn et al.

(10) Patent No.: US 8,389,627 B2
(45) Date of Patent: Mar. 5, 2013

(54) SILICONE RUBBER COMPOSITIONS COMPRISING BISMUTH OXIDE AND ARTICLES MADE THEREFROM

(75) Inventors: Slawomir Rubinsztajn, Ballston Spa, NY (US); Lowell Scott Smith, Niskayuna, NY (US); Charles Edward Baumgartner, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 191 days.

(21) Appl. No.: 13/006,677

(22) Filed: Jan. 14, 2011

(65) Prior Publication Data

US 2011/0112406 A1 May 12, 2011

Related U.S. Application Data

(62) Division of application No. 12/057,733, filed on Mar. 28, 2008, now Pat. No. 7,902,294.

(51) Int. Cl.
C08L 83/05 (2006.01)
(52) U.S. Cl. ......................... 524/858; 524/408
(58) Field of Classification Search .................. 524/858, 524/408
See application file for complete search history.

(56) References Cited

U.S. PATENT DOCUMENTS

| | | | |
|---|---|---|---|
| 4,651,850 A | 3/1987 | Matsuo | |
| 5,162,858 A | 11/1992 | Shoji et al. | |
| 6,418,084 B2 | 7/2002 | Saito et al. | |
| 7,054,002 B1 | 5/2006 | Sevick-Muraca et al. | |
| 2005/0070801 A1* | 3/2005 | Yamashita et al. | 600/459 |
| 2008/0202163 A1 | 8/2008 | Okinaka et al. | |
| 2009/0050852 A1 | 2/2009 | Kanamori et al. | |

FOREIGN PATENT DOCUMENTS

| | | |
|---|---|---|
| EP | 1288263 A1 | 3/2003 |
| EP | 1995281 A1 | 11/2008 |
| JP | 58216294 A | 12/1983 |
| JP | 59170173 A | 9/1984 |
| JP | 62011897 A | 1/1987 |
| JP | 62090139 A | 4/1987 |
| WO | WO2007068685 A1 | 6/2007 |

OTHER PUBLICATIONS

Hosono et al., "Effects of Fine Metal Oxide Particle Dopant on the Acoustic Properties of Silicone Rubber Lens for Medical Array Probe", IEEE Transactions on Ultrasonics, Ferroelectrics, and Frequency Control, vol. 54, No. 8, pp. 1589-1595, Aug. 2007.
Yamashita et al., "Effects of Metal Particle Dopant on Acoustic Attenuation Properties of Silicone Rubber Lens for Medical Echo Array Probe", Japanese Journal of Applied Physics, vol. 44, No. 6B, pp. 4558-4560, 2005.
Yamashita et al., "Effects of Sub-100 nm Platinum Metal Particle on the Acoustic Attenuation Properties of Silicone Rubber Lens for Medical Array Probe", Japanese Journal of Applied Physics, vol. 45, No. 5B, pp. 4684-4687, 2006.
Hosono et al., "Low Sound Speed and Acoustic Attenuation Silicone Rubber Lens Based on Heavy Density Ceramic Nanopowder Composite for Medical Array Probe", 2007 IEEE Ultrasonics Symposium, pp. 1913-1916, 2007.
Yamashita et al., "Effects of Ceramic Nanopowder Dopants on Acoustic Attenuation Properties of Silicone Rubber Lens for Medical Echo Probe", Japanese Journal of Applied Physics , vol. 46, No. 7B, pp. 4784-4789, 2007.
Yamashita et al., "Sub-10 nm Ytterbium Oxide Nanopowder-Doped Silicone Rubber Acoustic Lens Material for Medical Echo Array Probe", Japanese Journal of Applied Physics, vol. 46, No. 35, pp. L851-L853, 2007.
Gundimeda et al., "Acoustic Lens Composition for Ultrasound Probe", Technical Information Series, 2007GRV1074, pp. 1-13, Dec. 2007.

\* cited by examiner

*Primary Examiner* — Kuo-Liang Peng
(74) *Attorney, Agent, or Firm* — Andrew J. Caruso

(57) ABSTRACT

The present invention provides novel filled silicone compositions comprising a nano-particulate metal oxide filler selected from nano-particulate monoclinic alpha-phase bismuth oxide, nano-particulate erbium oxide, and mixtures thereof. The new composite compositions exhibit a combination of outstanding performance characteristics in both the cured and uncured states. Thus, the uncured formulations are typically free flowing liquids which are self-leveling, which de-gas readily under vacuum, are readily colorable through the addition of pigments, and which cure at temperatures of about 60° C. The cured compositions possess outstanding acoustic characteristics which make them ideally suited for use in applications such as acoustic lenses for medical imaging and therapy. For example, the acoustic impedance of compositions provided by the present invention is closely matched to the acoustic impedance of human tissue. This may result in an enhancement of ultrasound transmission efficiency between the lens of an ultrasound probe comprising such a composition and the patient.

8 Claims, No Drawings

SILICONE RUBBER COMPOSITIONS COMPRISING BISMUTH OXIDE AND ARTICLES MADE THEREFROM

This application is a divisional of application of U.S. patent application Ser. No. 12/057,733 filed Mar. 28, 2008, now U.S. Pat. No. 7,902,294. No new matter has been added.

BACKGROUND

The present invention relates to novel filled silicone compositions useful in the preparation of acoustic lenses for ultrasonic imaging or therapy devices.

The acoustic impedance of a typical silicone resin is relatively low, about 1 MRayls compared to the acoustic impedance of human tissue, which is typically about 1.5 MRayls. For purposes of acoustic lenses used in ultrasound probes for medical imaging, the mismatch in acoustic impedance between the silicone resin comprising the acoustic lens component of the ultrasound device and the patient's tissue results in reduction of ultrasound transmission efficiency between ultrasound probe and human body. The acoustic impedance of the silicone resin used as lens material can be increased and brought closer to acoustic impedance of human tissue by incorporation of higher density inorganic fillers. Many inorganic fillers such as fumed silica, quartz, $TiO_2$ and $Al_2O_3$ have been employed in an effort to increase the acoustic impedance of silicone resins useful in the preparation of acoustic lenses for ultrasound probes. Due to relatively low density (from about 2.2 to about 4.2 $g/cm^3$) of these metal oxides, a high filler loading (from 20 to 40 vol %) is required to attain acoustic impedances of 1.5 MRayls or higher. High filler loading results in undesirable properties of the filled silicone composition, for example high viscosity, difficult processing properties, and high acoustic attenuation. Recently, Yamashita and his coworkers reported several formulations of filled silicone compositions comprising high-density fillers such as heavy metals, and submicron-sized particles of heavy metal oxides. Filled silicone compositions disclosed by Yamashita exhibited acoustic impedance values of about 1.5 MRayls and were reported to comprise nano-particulate platinum metal and ytterbium oxide. Recent progress in the field of materials useful for the preparation of acoustic lenses for ultrasound probes notwithstanding, further improvements were desirable and are disclosed herein.

BRIEF DESCRIPTION

In one embodiment, the present invention provides a filled silicone composition comprising a silicone resin and a nano-particulate monoclinic alpha-phase bismuth oxide.

In another embodiment, the present invention provides a filled silicone composition comprising a silicone resin and a nano-particulate erbium oxide.

In yet another embodiment, the present invention provides a filled silicone composition comprising a silicone resin, a nano-particulate monoclinic alpha-phase bismuth oxide and a nano-particulate erbium oxide wherein the nano-particulate bismuth oxide has an average particle size of from about 10 nanometers to about 200 nanometers, and comprises from about 0.1 volume percent to about 10 volume percent of the total volume of the composition, and further wherein the nano-particulate erbium oxide is present in an amount corresponding to from about 0.1 volume percent to about 7 volume percent of the total volume of the composition.

In yet still another embodiment, the present invention provides an ultrasonic probe comprising a substrate material, a piezoelectric transducer, and an acoustic lens comprising a filled silicone composition comprising a silicone resin and a nano-particulate monoclinic alpha-phase bismuth oxide.

In another embodiment, the present invention provides an ultrasonic probe comprising a substrate material, a piezoelectric transducer, and an acoustic lens comprising a filled silicone composition comprising a silicone resin and a nano-particulate erbium oxide.

In another embodiment, the present invention provides an acoustic lens comprising a first curved surface and a second surface, wherein the acoustic lens comprises a filled silicone composition comprising a silicone resin and a nano-particulate monoclinic alpha-phase bismuth oxide.

In another embodiment, the present invention provides an ultrasound diagnostic apparatus comprising (a) an ultrasonic probe comprising (i) a substrate material, (ii) a piezoelectric transducer, and (iii) an acoustic lens comprising a filled silicone composition comprising a silicone resin and a nano-particulate alpha-phase bismuth oxide; (b) a signal processing unit; and (c) an image display.

DETAILED DESCRIPTION

As noted, in one embodiment, the present invention provides filled silicone compositions useful in the manufacture of acoustic lenses for medical imaging and therapy. The filled silicone compositions comprise a silicone resin and a nano-particulate inorganic filler. The nano-particulate inorganic filler is selected from the group consisting of nano-particulate monoclinic alpha-phase bismuth oxide, nano-particulate erbium oxide, and combinations thereof. As is disclosed herein, the presence of either or both nano-particulate inorganic fillers provides filled silicone compositions displaying outstanding performance characteristics in both the cured and uncured states.

By nano-particulate it is meant that the metal oxide being referred to has an average particle size in a range from about 10 nanometers to about 1 micron. In one embodiment, the nano-particulate metal oxide selected from nano-particulate monoclinic alpha-phase bismuth oxide, nano-particulate erbium oxide, and combinations thereof, has an average particle size in a range from about 10 nanometers to about 1 micron. In another embodiment, the nano-particulate metal oxide selected from nano-particulate monoclinic alpha-phase bismuth oxide, nano-particulate erbium oxide, and combinations thereof, has an average particle size in a range from about 10 nanometers to about 500 nanometers, in another embodiment from about 10 nanometers to about 200 nanometers, and in another embodiment, from about 10 nanometers to about 100 nanometers.

In one embodiment, the nano-particulate metal oxide comprises nano-particulate monoclinic alpha-phase bismuth oxide having an average particle size of from about 10 nanometers to about 1 micron, in another embodiment from about 10 nanometers to about 500 nanometers, in yet another embodiment from about 10 nanometers to about 200 nanometers, and in yet another embodiment from about 10 to about 100 nanometers.

In one embodiment, the nano-particulate metal oxide comprises nano-particulate erbium oxide having an average particle size of from about 10 nanometers to about 1 micron, in another embodiment from about 10 nanometers to about 500 nanometers, in yet another embodiment from about 10 nanometers to about 200 nanometers, and in yet another embodiment from about 10 to about 100 nanometers.

In one embodiment, the present invention provides a uncured filled silicone composition. In another embodiment, the present invention provides a cured filled silicone composition. Desirable properties of the uncured filled silicone composition provided by the present invention include relatively low viscosity for ease of handling, degassing and mold filling, relatively low cure temperatures, and colorability. Desirable properties of the cured filled silicone composition include excellent acoustic properties, wear resistance and subdued color.

Transformation of the uncured filled silicone composition provided by the present invention to the corresponding cured filled silicone composition may be effected by a variety of means but is most conveniently effected by hydrosilylation of one component of the uncured filled silicone composition by another component present in the uncured composition. Thus, in one embodiment, the silicone resin present in the uncured filled silicone composition comprises vinyl siloxane moieties and silicone hydride moieties, which react in the presence of a hydrosilylation catalyst to form a cured filled silicone composition. Suitable cure catalysts include precious metals which can serve as hydrosilylation catalysts, for example platinum, palladium, rhodium, and mixtures thereof. In one embodiment, the cure catalyst is Karstedt's catalyst. An important advantage of using cure chemistry based on hydrosilylation is that useful cure rates can be achieved at relatively low temperatures, for example at temperatures below about 80° C. In one embodiment, the uncured filled silicone composition may be cured at temperatures below about 60° C. In another embodiment, the uncured filled silicone composition may be cured at temperatures below about 50° C. The silicone resin components of the uncured filled silicone compositions provided by the present invention are well known in the art and are in many instances commercially available. The silicone resin present in the cured filled silicone composition provided by the present invention is at times referred to as a silicone rubber.

Nano-particulate monoclinic alpha-phase bismuth oxide may be prepared by heat treatment of a nano-particulate tetragonal beta-phase bismuth oxide at one or more temperatures in a range between about 305° C. and about 600° C. At temperatures in excess of about 600° C. the nano-particulate monoclinic alpha-phase bismuth oxide tends to form larger aggregates and is thereafter unsuited for use in an acoustic lens for medical imaging. Nano-particulate erbium oxide is available commercially.

In one embodiment, the present invention provides a filled silicone composition wherein the nano-particulate inorganic filler is selected from the group consisting of nano-particulate monoclinic alpha-phase bismuth oxide, nano-particulate erbium oxide, and mixtures thereof, and is present in an amount corresponding to from about 0.1 volume percent to about 15 volume percent, in another embodiment from about 1 to about 10 volume percent, in another embodiment from about 2 to about 10 volume percent, in another embodiment from about 2 to about 8 volume percent, and in yet another embodiment from about 4 to about 8 volume percent, of the total volume of the composition.

In one embodiment, the present invention provides a filled silicone composition wherein the nano-particulate inorganic filler is nano-particulate monoclinic alpha-phase bismuth oxide, and is present in an amount corresponding to from about 0.1 volume percent to about 15 volume percent, in another embodiment from about 1 to about 10 volume percent, in another embodiment from about 2 to about 10 volume percent, in another embodiment from about 2 to about 8 volume percent, and in yet another embodiment from about 4 to about 8 volume percent, of the total volume of the composition.

In another embodiment, the present invention provides a filled silicone composition wherein the nano-particulate inorganic filler is nano-particulate erbium oxide, and is present in an amount corresponding to from about 0.1 volume percent to about 15 volume percent, in another embodiment from about 1 to about 10 volume percent, in another embodiment from about 2 to about 10 volume percent, in another embodiment from about 2 to about 8 volume percent, and in yet another embodiment from about 4 to about 8 volume percent, of the total volume of the composition.

In yet another embodiment, the present invention provides a filled silicone composition wherein the nano-particulate inorganic filler is a combination of nano-particulate monoclinic alpha-phase bismuth oxide and nano-particulate erbium oxide, and is present in an amount corresponding to from about 0.1 volume percent to about 15 volume percent, in another embodiment from about 1 to about 10 volume percent, in another embodiment from about 2 to about 10 volume percent, in another embodiment from about 2 to about 8 volume percent, and in yet another embodiment from about 4 to about 8 volume percent, of the total volume of the composition. In one embodiment, the nano-particulate erbium oxide is present in an amount corresponding to less than about 75 volume percent of a total amount of inorganic filler present in the composition.

The filled silicone compositions provided by the present invention may comprise other inorganic fillers in addition to nano-particulate monoclinic alpha-phase bismuth oxide, nano-particulate erbium oxide, or combinations of nano-particulate monoclinic alpha-phase bismuth oxide and nano-particulate erbium oxide. Additional inorganic fillers which may be present include silica, quartz, titania, alumina, zinc oxide, and combinations thereof. In one embodiment, the filled silicone composition provided by the present invention comprises fumed silica. In another embodiment, the filled silicone composition provided by the present invention comprises quartz.

In one embodiment, the filled silicone composition provided by the present invention further comprises a pigment, for example carbon black. In one embodiment, the filled silicone composition provided by the present invention further comprises a pigment selected from the group consisting of carbon black, sodium aluminosulfosilicate, manganese ferrite, and iron oxide.

In one embodiment, the present invention provides an ultrasonic probe comprising (a) a substrate material; (b) a piezoelectric transducer; and (c) an acoustic lens wherein the acoustic lens comprises a filled silicone composition provided by the present invention. Thus, in one embodiment, the acoustic lens comprises a filled silicone composition comprising a silicone resin and a nano-particulate monoclinic alpha-phase bismuth oxide. In one embodiment, the nano-particulate monoclinic alpha-phase bismuth oxide has an average particle size of from about 10 nanometers to about 200 nanometers. In another embodiment, the filled silicone composition further comprises nano-particulate erbium oxide. In yet another embodiment, the filled silicone composition further comprises a pigment. In one embodiment, the pigment is selected from the group consisting of carbon black, sodium aluminosulfosilicate, manganese ferrite, and iron oxide. In one embodiment, the acoustic lens comprises a filled silicone composition comprising a silicone resin and a nano-particulate erbium oxide.

In one embodiment, the present invention provides an acoustic lens having a first curved surface and a second surface, the acoustic lens comprising a filled silicone composition of the present invention. In one embodiment, the filled silicone composition comprising the acoustic lens comprises a silicone resin and a nano-particulate monoclinic alpha-phase bismuth oxide.

In one embodiment, the present invention provides ultrasound diagnostic apparatus comprising an acoustic lens made from a composition provided by the present invention. Thus, in one embodiment, the present invention provides a ultrasound diagnostic apparatus comprising (a) an ultrasonic probe comprising (i) a substrate material, (ii) a piezoelectric transducer, and (iii) an acoustic lens comprising a filled silicone composition comprising a silicone resin and a nano-particulate monoclinic alpha-phase bismuth oxide; (b) a signal processing unit; and (c) an image display.

In one embodiment, the present invention provides an ultrasonic probe comprising an acoustic lens comprising a composition of the present invention, said acoustic lens having a first curved outer surface and a second inner surface in contact with a first surface of an acoustic matching film layer. A second surface of the acoustic matching film layer is in contact with a piezoelectric transducer comprising a piezoelectric layer, and a pair of electrodes, the piezoelectric layer being disposed on a substrate material (backing) which may comprise a filled epoxy thermoset material or other suitable material. The piezoelectric transducer comprises a plurality of such piezoelectric layer-electrode combinations in contact with an acoustic matching layer. Each of the electrodes is connected to a ground electrode plate or a printed circuit board.

In one embodiment, the ultrasonic probe provided by the present invention comprises piezoelectric elements and acoustic matching layers configured as a one dimensional array.

In one embodiment, the present invention provides an ultrasound diagnostic apparatus comprising an ultrasonic probe, a signal processing unit, and an image display. The signal processing unit may be any electronic device capable of directing the acoustic output of the piezoelectric transducer and receiving and processing the input from the piezoelectric transducer. Signal processing units are typically a central processing unit (cpu) as used in personal computers or a digital signal processing chip like the TMS320 series digital signal processors available from Texas Instruments. A variety of image display devices are available and include conventional image display monitors.

One of ordinary skill in the art will understand the utility of the compositions provided by the present invention and their use as components of devices such as ultrasonic probes, acoustic lenses, and ultrasound diagnostic apparatus. Thus, the present disclosure provides novel compositions which may be used to form an acoustic lens using standard lens-forming techniques and thereafter the acoustic lens may be incorporated into a more complex device comprising conventional components such as a piezoelectric transducer element formed on a substrate material, a signal processing unit, and an image display.

EXAMPLES

Nano-partiuculate metal oxides were purchased from three sources: Nanostructured and Amorphous Materials Inc. Huston Tex., Sigma-Aldrich Coorporation Milwaukee, Wis., and Nanophase Technologies Corporation Romeoville, Il. Properties of various nano-particulate metal oxides studied are gathered in Table 1.

TABLE 1

Physical Properties of Selected Nano-particulate Metal Oxides

| Metal Oxide | Formula | Supplier | Density g/cm3 | Particle Size nm | Surface Area m2/g |
|---|---|---|---|---|---|
| Iron Oxide - Magnetite | $Fe_3O_4$ | Aldrich | 4.8-5.1 | 20-30 | 60 |
| Ytterbium Oxide | $Yb_2O_3$ | Aldrich | 9.17 | <50 | — |
| Iron Oxide | $Fe_2O_3$, alpha | Nanoamor.com | 5.24 | 20-50 | 50 |
| Zinc Oxide | ZnO | Nanoamor.com | 5.6 | 20 | 50 |
| Zinc Oxide | ZnO | Nanoamor.com | 5.6 | 90-210 | 4.9-6.8 |
| Zirconium Oxide | $ZrO_2$ | Nanoamor.com | 5.68 | 20-30 | 30-60 |
| Zirconium Oxide | $ZrO_2$ | Nanoamor.com | 5.68 | 29-38 | 15-35 |
| Tungsten Oxide | $WO_3$ | Nanoamor.com | 7.16 | 30-70 | — |
| Gadolinium Oxide | $Gd_2O_3$ | Nanoamor.com | 7.41 | 20-80 | 10-40 |
| Samarium oxide | $Sm_2O_3$ | Nanoamor.com | 8.35 | 33-40 | 18-22 |
| Erbium Oxide | $Er_2O_3$ | Nanoamor.com | 8.64 | 43 | 16 |
| Bismuth oxide | $Bi_2O_3$, beta | Nanoamor.com | 8.9 | 90-210 | 3.2-3.5 |
| Bismuth oxide | $Bi_2O_3$, beta | Nanophase | 8.9 | 38 | 18 |

Silicone 2-part addition cure resins RTV615 and SLE 5401 were obtained from Momentive Performance Materials Waterford, N.Y. Silicone components such as silicone resin (88295), silicone vinylstopped polydimethylsiloxane (PDMS) (SL6000), and silicone crosslinker (88104) were obtained from Momentive Performance Materials. Tetramethyltetravinylcyclotetrasiloxane (SIT7900.0) and Platinum-cyclovinylmethylsiloxane complex—2-2.5 wt % Pt (SIP6832.2) were purchased from Gelest Inc. Morrisville, Pa. Phenyltrimethoxysilane, octyltrimethoxysilane, vinyltrimethoxysilane, allyltrimethoxysilane were purchased from Gelest. Silcopas Black 220 (dispersion of $Fe_3O_4$ in vinylstopped polydimethylsiloxane fluid) was obtained from Gayson Specialty Dispersion Inc. Barberton, OH.

Screening of Fillers

Liquid Formulations: Dispersions of metal oxide nanoparticles in a low viscosity silicone formulations comprising RTV615 and about 4.2 vol % R8200 well treated fumed silica and a desirable amount of the filler required to obtained a target density were prepared and the acoustic properties of cured samples prepared from these formulations were screened. A target density of the resultant cured composite composition was 1.55 $g/cm^3$+/−0.05 $g/cm^3$. The dispersions were prepared on a Speedmixer DAC 400 available from FlackTek Inc. Landrum, S.C. A typical procedure is illustrated as follows: (a) Charge 10 g of RTV615A pre-filled with R8200 treated fumed silica to a 50 ml plastic container, (b) Add from 7 to 9 grams of the nano-particulate metal oxide filler, (c) Mix in Speedmixer 4 times for 45 seconds at 2700 rpm, (Caution: The material may become hot during the mixing step), (d) Cool the resultant composite mixture to 20° C., (e) Add 1 g of RTV615B, (f) Mix by hand, (g) Mix in Speedmixer 3 times for 10 seconds at 2700 rpm, (h) Degas in a vacuum desiccator for 15 minutes at 1 mm Hg (i) Pour the degassed dispersion to a TEFLON® mold, (j) Degas the dispersion contained in the TEFLON® mold in a vacuum desiccator for 5 minutes at 1 mm Hg, (k) Remove excess dispersion from the mold, and (l) Cure the dispersion in the mold at 60° C. for 4 hrs to afford a cured test sample.

Formulation with 88295 Silicone Resin: The dispersions of nano-particulate metal oxide in a silicone resin were prepared using an Exakt 50 three roll mill. A typical procedure is as follows: (a) Charge 10 g of 88295 silicone resin to 50 ml plastic container, (b) Add desired amount of the nano-particulate metal oxide powder (30-40 g), (c) Mix in Speedmixer, 3×45 seconds at 2700 rpm (Caution: The material may heat up during high speed mixing), (d) Transfer resulting paste to a three roll mill, (e) Mill at the minimum gap setting and collect the dispersion on the scrape blade, (f) Return the dispersion to the three roll mill and repeat the milling process from three to ten times, (g) Transfer the final dispersion to a plastic container, (h) Add required amount of the 88295 resin, (i) Mix in the Speedmixer (3×45 sec at 2700 rpm), (j) Add the Pt catalyst and tetramethyltetravinylcyclotetrasiloxane inhibitor, (k) Mix in the Speedmixer 3 times 30 sec at 2700 rpm, (l) Cool the resultant mixture to at least 20° C., (m) Add the desired amount of Silcopas Black 220 and hydrido functionalized siloxane crosslinker (88104), (n) Mix well by hand until the mixture is a uniform rich gray color, (o) Perform a final mix on Speedmixer 2×15 sec at 2700 rpm, (p) Degas the mixture in vacuum desiccator for 15 minutes at 1 mmHg, (q) Pour the mixture into a TEFLON® mold, (r) Degas mixture in the mold in the vacuum desiccator for 5 minutes at 1 mmHg, (s) Remove excess material from the mold, and (t) Cure at 60° C. for 4 hrs.

In-Mold Cure Conditions: The uncured filled silicone composition was degassed and poured into a TEFLON® mold 5×5×0.3 cm. The mold containing the uncured filled silicone composition was placed in a vacuum desiccator for 5 minutes at 1 mmHg. Any excess uncured filled silicone composition was removed with a doctor blade. The mold containing the uncured filled silicone composition was placed in a laboratory oven (model VWR 1330LM) and held at 60° C. for 4 hours to effect curing and providing a cured filled silicone composition.

Filler Treatments, Bismuth Oxide: 250 g of a commercial nano-particulate beta-phase bismuth oxide powder was placed on a ceramic tray and inserted into a Lindberg Blue M high temperature programmable box furnace. The beta-phase $Bi_2O_3$ sample was heated at 450° C. for 2 hrs and then cooled to ambient temperature over 5 hrs to provide nano-particulate alpha-phase bismuth oxide. The heat treated $Bi_2O_3$ was stored in a closed glass jar until needed.

Filler Treatments Erbium Oxide: 500 g of commercial nano-particulate erbium oxide powder and 12.5 g of phenyltrimethoxysilane were charged to a glass jar. The powder was mixed on a roller mixer for 3 hrs at ambient temperature. The closed jar was placed in a vacuum oven at 110° C. for 1 hour. Caution should be exercised as pressure may build up during heating. To this end, the jar was carefully vented at 15 minute intervals throughout the heating step. After 1 hour the lid of the jar was removed and the treated erbium oxide was heated at 160° C. in the vacuum oven to remove volatiles for at least 2 hours. The treated $Er_2O_3$ was cooled to ambient temperature and stored in a closed jar until needed.

Test Methods

The acoustic properties of the new lens material were characterized. Cured test samples were prepared by casting the lens material in a mold having dimensions of (5 cm)×(5 cm)×(0.2-0.5 cm). The sample was degassed and then cured in the mold.

The acoustic longitudinal velocity, impedance, and attenuation of the cured test samples were measured. The measurements were done in a water tank with two identical transducers mounted facing each other. Using one as a transmitter, a short pulse from a Panametrics 5800 pulser/receiver, was sent through a water path to the receiving transducer. A thin sample can be suspended between the transducers, in the path of the ultrasound beam. The time of flight and echo amplitude are recorded with the sample present and absent.

The sample velocity $c_s$ is given by $$c_s = c_{H_2O}\left(\frac{1}{1 + c_{H_2O}\frac{(t_s - t_0)}{d}}\right)$$

where "$c_{H2O}$" is the sound velocity in water, "$t_s$" is the delay time with the sample in the sound beam, "$t_0$" is the delay time of the reference water path beam, and 'd' is the thickness of the sample. The sample thickness 'd' is measured with a micrometer height gauge at five points (the corners of a square and the center). This measurement is done in the region that intercepts the beam. It is a good practice to measure the temperature of the water bath at the beginning and end of the experiment since the velocity of sound in water has a small dependence on temperature. In order to accurately measure the time delay, the received signal is displayed with the expanded time base on the oscilloscope. The vertical position is adjusted so that the signal's baseline coincides with a horizontal grid line, called the "zero line". A time cursor is positioned near the first significant (i.e. easily identifiable) zero crossing. The use of an early point on the waveform minimizes dispersion effects. For the sample measurement, the sample position is rotated to generate an extremum. For materials with velocity slower (faster) than water, the sample is positioned so that the cursor finds the extremum near the tail (front) of the received waveform. The cursor is then adjusted to line up with the zero line and the time delay from the oscilloscope is recorded.

Standard methods use the waveform analysis feature of the oscilloscope to measure the peak to peak signal voltage. The signal is allowed to average for about 10 seconds before recording the results, and the amplitude measurements were repeated twice to assure consistency. The attenuation per unit length, 'attn' is given by $$Attn = \frac{20}{d}\log_{10}\left(\frac{V_{pps}}{V_{pp}}\right)$$

where $V_{pps}$ and $V_{pp}$ are the peak to peak signal voltages from the sample and reference respectively.

One advantage of a relatively thin sample is that the signal is not significantly distorted. Test samples were 2-3 mm thick and time delays of more than 5 wavelengths at 5 MHz along with raw signal attenuation usually less than 15 dB were observed. Acoustic impedance differences between the sample and water could also contribute to the reflection losses although such losses were usually found to be insignificant for test sample materials with acoustic impedance similar to the human body (1.25 MRayls<$Z_{lens}$<1.6 MRayls).

The impedance and attenuation of the cured test samples were recorded on a measurement bench using the broadband pulse technique over a wide frequency range of 3 to 10 MHz. The measurement bench included a water tank including 3 sets of wide band transducers (transducer center frequencies are: 3, 7.5 and 10 MHz) aligned in opposition, a sample holder, which allowed sample rotation, a waveform generator, a numerical oscilloscope, and computer to drive the waveform generator and the numerical scope.

Abrasion testing of the cured filled compositions was conducted on a conventional pin-on-disc tribometer using ASTM G09-095a (2000).

Mechanical properties of the cured silicone elastomers were evaluated using an INSTRON testing device at ambient conditions.

Chemical resistance: Test samples were soaked in four different chemicals for 24 hours. The test chemicals included, paraben soup (20% dichlorobenzene in 80% ethanol), commercially available disinfectant Cidex OPA, 2% isopropyl myristate in 98% ethanol, and 100% isopropanol. For each test chemical, four samples were weighed before and after the soak. The percentage weight gain was calculated. The new lens materials provided by the present invention exhibited lower chemical absorption than a standard lens material.

Viscosity of the uncured filled silicone composition was measured using a CAP2000+ Brookfield viscometer.

Thermal conductivity of the filled silicone compositions was determined using a Thermetrix TCA-300 thermal conductivity analyzer using cured 2-inch diameter test samples. The thickness of the test samples was measured with a digital micrometer. Test samples were coated with DOW Corning 340 Heat Sink Compound and thermal conductivity measurements were taken at approximately 65° C.

Shore A Hardness values of the cured filled silicone compositions were determined using a handheld Starrett Digital Durometer No. 3805.

Results and Discussion

A typical flowable silicone formulation used to manufacture ultrasound lenses is filled with quartz micron size particles as an inorganic filler. While serviceable, as a castable lens-forming material, such materials may suffer from a number of deficiencies including low abrasion resistance, relatively high permeability to gels employed in ultrasound procedures, and cleaning chemicals such as paraben, isopropanol, isopropyl myristate, and Cidex OPA, and exhibit relatively low acoustic impedance. At the outset of the research underlying the present invention, a list of desired properties was established as a basis for screening new filled silicone compositions useful as acoustic lens materials. This list of target properties of a new lens material is presented in Table 2.

TABLE 2

Target Properties For New Filled Silicone Compositions Useful As Acoustic Lens Materials

| | Value |
|---|---|
| Uncured properties: | |
| Consistency | Pourable |
| Color | Blue or Gray or Black |
| Viscosity | <120000 cps |
| Specific Gravity | 1.55-1.85 g/ml |
| Work time at 25° C. | Min 3 hrs |
| Cure conditions | 4 hrs at 60° C. |
| Cured Properties | |
| Hardness, Shore A | >50 |
| Tensile Strength | >4 MPa |
| Elongation | >200% |

TABLE 2-continued

Target Properties For New Filled Silicone Compositions Useful As Acoustic Lens Materials

| | Value |
|---|---|
| Abrasion | > Quartz filled silicone |
| Shrinkage | <0.8% |
| Sound velocity | <1000 m/s |
| Acoustic impedance | 1.35-1.55 MRayls |
| Attenuation | <0.7 dB/mmMHz |
| Peel Adhesion | = or > Quartz filled silicone |
| Thermal conductivity | = 0.31 W/mK |
| Toxicity | None |
| Chemical resistance | = or > Quartz filled silicone |

Nano-particulate metal oxide powders in an amount required to obtain a final density in a range from about 1.55 to about 1.65 g/cm$^3$) were blended into the "addition curable" silicone resin material RTV615 obtained from Momentive Performance Materials which contained approximately 4 volume percent (vol %) R8200 (treated fumed silica from Degussa Corporation). The filled silicone compositions comprising nano-particulate metal oxides were screened for evidence of low viscosity and flowability before curing, and low acoustic attenuation of cured samples prepared from the uncured filled silicone compositions. The results of the screening studies are summarized in Table 3. Most of the filled silicone compositions screened were found to be unsuitable for use in the manufacture of acoustic lenses because, for example, the uncured filled silicone composition did not flow, had an inappropriate density, or exhibited excessive sound attenuation upon curing. Based on the initial screening results shown in Table 3, two nano-particulate metal oxide fillers appeared to show promise: erbium oxide ($Er_2O_3$) having an average particle size of about 43 nanometers and beta-phase bismuth oxide having an average particle size of from about 30 nanometers to about 210 nanometers. Uncured filled silicone compositions comprising the erbium oxide or tetragonal beta-phase bismuth oxide fillers exhibited excellent dispersion of the nano-particulate metal oxide in the RTV615 silicone resin. The uncured filled silicone compositions were flowable and exhibited relatively low viscosity. The uncured filled silicone compositions containing the nano-particulate erbium oxide or beta-phase bismuth oxide were cured in a mold at 60° C. to provide cured test samples which showed good acoustic properties and hardness from 50 to 61 Shore A. However, the cured filled silicone composition comprising beta-phase bismuth oxide was bright yellow in color. In contrast, the cured filled silicone composition comprising $Er_2O_3$ was pink in color. As will be appreciated by those skilled in the art, inherently brightly colored materials may present difficulties when attempting to adjust the color of articles comprising the inherently brightly colored material. This is particularly true of filled silicone compositions which are inherently bright yellow but which are intended to be used in applications requiring a more subdued color such as light blue or grey. While a bright yellow acoustic lens as a component of an ultrasonic probe might not be of itself objectionable, the inability to adjust the color of the lens to an alternative color may be viewed as a serious design limitation.

TABLE 3

Results of Filler Screening Experiments

| Metal Oxide | Viscosity cPs | Density g/cm3 | Hardness Shore A | Speed of Sound m/s | Impedance MRayls | Attenuation dB/mm @ 5 MHz |
|---|---|---|---|---|---|---|
| Iron Oxide (20-50 nm) | 37500, Flows | 1.561 | 57 | 1021 | 1.60 | −9.37 |

TABLE 3-continued

Results of Filler Screening Experiments

| Metal Oxide | Viscosity cPs | Density g/cm3 | Hardness Shore A | Speed of Sound m/s | Impedance MRayls | Attenuation dB/mm @ 5 MHz |
|---|---|---|---|---|---|---|
| Zinc Oxide (20 nm) | >100000, Paste | 1.578 | ND | ND | ND | ND* |
| Zinc Oxide (90-210 nm) | >100000, Paste | 1.578 | ND | ND | ND | ND |
| Zirconium Oxide (20-30 nm) | >50000 paste | 1.562 | 60 | 900 | 1.406 | −4.6 |
| Zirconium Oxide (29-38 nm) | >50000, Paste | 1.534 | 70 | 960 | 1.47 | −8.4 |
| Tungsten Oxide (30-70 nm) | 12700, Flows | 1.672 | 50 | 850 | 1.42 | −8.1 |
| Gadolinium Oxide (20-80 nm) | >50000, Paste | 1.672 | ND | ND | ND | ND |
| Samarium oxide (33-40 nm) | 40000, Paste | 1.592 | 62 | 890 | 1.42 | −3.9 |
| Erbium Oxide (43 nm) | 17300, Flows | 1.66 | 61 | 872 | 1.387 | −2.5 |
| Erbium Oxide (41-53 nm) | >100000, Paste | 1.6 | ND | ND | ND | ND |
| Bismuth oxide (90-210 nm) | 10200, Flows | 1.564 | 50 | 880 | 1.376 | −3.6 |

*ND = "not determined"

When the uncured filled silicone compositions were prepared on a larger scale, the nano-particulate tetragonal beta-phase bismuth oxide was found to exhibit a significant inhibition of the cure reaction. For example, after heating the uncured filled silicone composition containing nano-particulate beta-phase bismuth oxide for 6 hours at 60° C. the cured samples exhibited significantly lower hardness (about 35 Shore A) than had been observed earlier, and the lower hardness was attributable to incomplete curing. A different batch of beta-phase bismuth oxide obtained from a second supplier (Nanophase Technologies Corp.) showed even stronger cure inhibition, and the cured samples were sticky to the touch. Cure inhibition of uncured filled silicone compositions containing nano-particulate beta-phase bismuth oxide was suspected initially to be due to the presence of impurities which inhibited the hydrosilylation reaction responsible for the curing process, or alternatively to a particularly strong interaction of the nano-particulate beta-phase bismuth oxide particles with the crosslinking agent present in the curable silicone resin, or the hydrosilylation (Pt) catalyst.

Elemental analysis of three separate batches of nano-particulate tetragonal beta-phase bismuth oxide from different suppliers did not reveal the presence of distinguishing contaminants or species known to inhibit the hydrosilylation reaction. Each of the nano-particulate beta-phase bismuth oxide samples appeared to be high purity $Bi_2O_3$ containing some excess oxygen. X-Ray Diffraction (XRD) analysis confirmed that all three nano-particulate bismuth oxide samples were indeed tetragonal β-phase $Bi_2O_3$. Samples of the beta-phase bismuth oxide were also analyzed by Thermal Gravimetric Analysis (TGA).

TGA analysis of the commercial beta-phase bismuth oxide samples showed about 0.25% weight loss during the first heating cycle (ambient temperature to 500° C. over approximately 80 minutes). Interestingly, a second heating cycle after exposure to ambient conditions for 16 hrs showed only 0.07% weight loss. This result suggested that there were two different sources of the mass loss observed since mass loss due to desorption of surface water alone might be expected to be the same in the first heating cycle and the second heating cycle following re-exposure of the sample to atmospheric moisture. Examination of the TGA curve from the first heating cycle revealed two separate mass loss events. The first, and smaller, loss of mass occurred in a temperature range between ambient temperature and about 200° C. and was attributed to loss of water adsorbed on the surface of nano-particulate beta-phase bismuth oxide particles. The second, and larger, loss of mass took place in a temperature range between about 200° C. and about 500° C. and was attributed to the loss of excess oxygen from the nano-particulate beta-phase bismuth oxide and a transition from a meta-stable tetragonal beta-phase bismuth oxide to a more stable monoclinic α-phase (monoclinic alpha-phase bismuth oxide). The transformation of the beta-phase bismuth oxide to monoclinic alpha-phase bismuth oxide crystal was confirmed by XRD and shown to be quantitative or nearly so. The heat-treated $Bi_2O_3$ (monoclinic alpha-phase nano-particulate bismuth oxide) was mixed with RTV615 to determine the effect of heat treatment on viscosity and cure behavior of the uncured filled silicone composition. Blends of RTV615 with heat-treated $Bi_2O_3$ from multiple suppliers had viscosities similar to blends of untreated beta-phase bismuth oxide, and cured well to form cured filled silicone compositions (at times referred to herein as "silicone composites") exhibiting Shore A hardness values of 49 to 50. The mechanism by which the β-phase $Bi_2O_3$ inhibits curing of the filled uncured silicone composition is not well understood, but was both reproducible and presented a significant obstacle to the preparation of test articles from uncured filled silicone compositions comprising beta-phase bismuth oxide. It is noteworthy that heat treatment of the nano-particulate beta-phase bismuth oxide at temperatures above 600° C. led to formation of large crystals of alpha phase bismuth oxide. As will be appreciated by one of ordinary skill in the art, the presence of large crystals of bismuth oxide in the uncured filled silicone composition employed will result in silicone composites with very high acoustic attenuation.

Interestingly, a significant color change from bright orange-yellow to pale yellow was observed as the nano-particulate bismuth oxide was converted thermally from the β phase to the α phase. This color change has significant implications from a design point of view in that the pale yellow alpha-phase bismuth oxide provides filled silicone compositions which are more readily colorable than the corresponding filled silicone compositions comprising the bright yellow beta-phase bismuth oxide. Typically, ultrasound probes feature an acoustic lens which is either blue or grey in color. Untreated β-phase $Bi_2O_3$ exhibits such an intense yellow color that it was difficult to change the color of the filled silicone composition to gray by the addition of carbon black or black iron oxide particles. The pale yellow color of filled silicone compositions comprising the α-phase $Bi_2O_3$ can be changed easily from pale yellow to gray by incorporation of small amounts of iron oxide or carbon black into the composition.

During the course of this study it was found that blends of $Er_2O_3$ (erbium oxide) with RTV615 exhibited higher viscosity than the blends of RTV615 with $Bi_2O_3$ and, moreover, filled uncured silicone compositions comprising the nano-particulate erbium oxide at times performed poorly during degassing and required a longer degassing step. Poor performance during the degassing step was thought to be related to the surface characteristics of the nano-particulate erbium oxide. A series of filler treatment experiments was carried out in order to determine if the degassing performance of the nano-particulate erbium oxide-containing formulations could be improved. The effect of filler treatment with different organoalkoxysilanes on the degassing performance characteristics of filled silicone compositions comprising treated nano-particulate erbium oxide was investigated and results are presented in Table 4. The filled silicone compositions comprising the treated nano-particulate erbium oxides were prepared as generally described herein. In Table 4 All-Si(OMe)$_3$ represents allyl trimethoxysilane, Vi-Si(OMe)$_3$ represents vinyl trimethoxysilane, Ph-Si(OMe)$_3$ represents phenyl trimethoxysilane, and Oct-Si(OMe)$_3$ represents octyl trimethoxysilane.

TABLE 4

Effect of Filler Treatment With Organoalkoxysilanes on Degassing and Cure Steps for Filled Silicone Compositions Comprising RTV615 as the Base Resin.

| Exp. Number | 2.5 wt % Alkoxy Silane | Viscosity cPs | Degas Process/min | Hardness Shore A |
|---|---|---|---|---|
| F108-071 | None | 18500 | 30 | 61 |
| F108-071A | All—Si(OMe)$_3$ | 16600 | 12 | 61 |
| F108-071B | Vi—Si(OMe)$_3$ | 15700 | 15 | Uncured! |
| F108-071C | Ph—Si(OMe)$_3$ | 17000 | 10 | 63 |
| F108-071D | Oct—Si(OMe)$_3$ | 17200 | 45 | 61 |

The filled silicone composition comprising erbium oxide exhibiting the shortest degassing time, the most favorable viscosity and providing the highest post cure hardness values comprised the erbium oxide filler treated with phenyltrimethoxy silane. Thus in one aspect the present invention provides an improved filled silicone composition comprising an alpha-phase bismuth oxide, and in another embodiment the present invention provides a filled silicone composition comprising alkoxysilane treated nano-particulate erbium oxide.

Dispersion of Filler in the Silicone Resin

It is known that acoustic attenuation of a composite composition is proportional to volume % of the filler present, the filler density, and the size of the filler particles. It was hoped that cured filled silicone compositions comprising a nano-particluate filler in an amount corresponding to a relatively small volume % of the composition as a whole might exhibit superior acoustic attenuation properties. Commercial nanoparticles are typically provided as micron size aggregates. Dispersion of these aggregates into a silicone resin to form filled silicone compositions comprising nano-particulate fillers presents a significant challenge, especially when employing standard laboratory equipment. Several methods of dispersion of $Bi_2O_3$ nanoparticles were evaluated. The degree of dispersion was evaluated by scanning electron microscopy ("SEM") and by measurement of the acoustic attenuation of the cured samples prepared from the uncured filled silicone compositions. Results are summarized in Table 5.

TABLE 5

Evaluation of The Process Equipment For Dispersion of Nano-Particles

| Process | Attenuation dB/mm @ 5 MHz | Comments |
|---|---|---|
| Speed Mixer | −3.6 | Easy to use and scale up. Unable to break nano-aggregates |
| High energy shaker | −11.6 | Expensive equipment, difficult to scale up. Low yield due to difficult material recovery |
| Ultrasonic homogenizer | −11.7 | Scale up require expensive set-up. Low efficiency in breaking of nano-aggregates |
| Pestle and mortar | −1.8 | Easy to use and scale up. Labor intensive |
| Three roll mill | −2.1 | Easy to use and scale up. High efficiency in grinding. High yield. |
| High shear homogenizer | NA | Requires special equipment for high viscosity fluids. Large volume required. |
| Rotary grinder | −3.9 | Requires expensive equipment difficult material recovery |

SEM images of $Bi_2O_3$ filled silicone composites revealed a high level of dispersion of the filler when dispersion of the filler was carried out using a three-roll mill. The three-roll mill offers several advantages such as the ability to mix relatively high viscosity blends, efficient mixing, sample size flexibility, ease of scale-up, and is a common piece of equipment among commercial compounders. Moreover, uncured filled silicone compositions prepared by dispersion of the nano-particulate bismuth oxide in a silicone resin on a three-roll mill afforded cured samples exhibiting consistently low acoustic attenuations.

Resin Selection

Two commercially available unfilled 2-part silicone resins were examined initially, RTV615 and SLE5401. Properties of both materials are summarized in Table 6.

TABLE 6

Key Properties of Selected Silicone Addition Cure Compositions

| Resin | Quartz filled 2-part silicone resin (Std) | RTV615 | SLE5401 |
|---|---|---|---|
| Uncured properties: | | | |
| Consistency | Pourable | pourable | Pourable |
| Color | Blue | Clear | Clear |
| Viscosity/cPs | 120000 | 4000 | 25000 |
| Cure conditions | 4 hrs @ 60 C. | 4 hrs @ 60 C. | 1 hr @ 120 C. |
| Cured Properties | | | |
| Hardness, Shore A | 60 | 44 | 54 |
| Tensile Strength MPa | 5.65 | 6.34 | 5.52 |
| Elongation % | 250 | 120 | 200 |
| Adhesion | Requires Primer | Requires Primer | Primer-less |

Both of the commercial materials RTV615 and SLE5401 are low viscosity resins, and afford high strength silicone rubbers upon curing. A potential advantage of SLE5401 is its primer-less adhesion characteristic. It is believed that silicone resins exhibiting a primer-less adhesion characteristic may offer manufacturing process advantages and improve the reliability of the ultrasound probe acoustic lenses. Unfortunately, compositions studied herein comprising SLE5401 exhibited a reluctance to undergo curing under standard conditions (12 hrs ambient temperature and 2 hrs at 50° C.). RTV615 can be cured under standard conditions but the cured resin has relatively low elongation compared to a quartz filled 2-part silicone resin standard. The incorporation of small amounts of treated fumed silica R8200 from Degussa into the uncured resin improves significantly the elongation at break while maintaining the low viscosity characteristic of RTV615. RTV615 filled with about 4 vol % of R8200 fumed silica was selected as the base resin for evaluation of metal oxide nano-particulate fillers.

RTV615 containing 4 vol % of R8200 fumed silica was blended with about 9.5 vol % of nano-particulate bismuth oxide (or erbium oxide) on a three roll mill. The formulations (Table 7) exhibited relatively low viscosites, typically in range from about 13000 to about 20000 cPs. The formulations with as much as 11 vol % of alpha-phase bismuth oxide flowed well and were found to be self-leveling. The corresponding erbium oxide-containing formulations with similar volume percent of nano-particulate erbium oxide were thixotrophic and did not self-level under ambient conditions. Formulations comprising nano-particulate erbium oxide did, however, exhibit better mechanical properties such as hardness and tensile strength.

TABLE 7

Mechanical And Acoustic Properties of RTV615 Comprising Nano-Particulate Alpha-Phase Bismuth Oxide or Erbium Oxide Nano-Particles.

| Filler | Self-Level | Tensile Strength/Mpa | Elongation/% | Hardness/ Shore A | Speed of Sound/m/s | Impedance/ MRayls | Attenuation/ dB/mm @ 5 MHz |
|---|---|---|---|---|---|---|---|
| None | yes | 2.27 | 172 | 49 | 1028 | 1.05 | −1 |
| 5 vol % R8200 | yes | 2.28 | 233 | 49 | 1010 | 1.09 | −1.65 |
| 4.5 vol % R8200, 9.4 vol % $Bi_2O_3$ | yes | 3.25 | 247 | 49 | 810 | 1.47 | −3.7 |
| 2 vol % R8200, 9.1 vol % $Er_2O_3$ | borderline | 4.2 | 260 | 61 | 830 | 1.45 | −3.3 |

The abrasion resistance of cured samples prepared from the uncured filled silicone compositions comprising the silicone resin RTV615, fumed silica, and either nano-particulate monoclinic alpha-phase bismuth oxide or nano-particulate erbium oxide were compared to formulations which employed a standard quartz filled 2-part silicone resin. Abrasion resistance tests indicated that the quartz filled 2-part silicone resin afforded cured test samples having superior abrasion resistance.

In one embodiment, the present invention provides a filled silicone composition comprising a silicone resin which is addition curable and comprises a vinyl-fuctionalized silicone resin such as 88295 from Momentive Performance Materials. The vinyl containing silicone resin provides good reinforcement without affecting rheological properties of the fluid. Filled silicone compositions comprising 88295 resin were also evaluated. The filled silicone compositions comprising 88295 and nano-particulate monoclinic alpha-phase bismuth oxide or nano-particulate erbium oxide exhibited superior physical and acoustic properties (Table 8) as well as good abrasion resistance.

TABLE 8

Mechanical And Acoustic Properties of 88295 Resin Filled With Alpha-phase Bismuth Oxide or Erbium Oxide Nano-Particles.

| Silicone Resin Employed | Quartz filled 2-part silicone resin | 88295 | 88295 |
|---|---|---|---|
| Vol % Metal Oxide Filler | — | 10.7 vol % $Bi_2O_3$* | 10.1 vol % $Er_2O_3$ |
| Is One Part Possible | Yes | yes | yes |
| Color | Blue | yellow | Gray |
| Viscosity/cPs | 150000 | 35000 | 100000 |
| Pot Life @ 25 C./hrs | 4 | 3 | 3 |
| Density/g/cm3 | 1.28 | 1.86 | 1.83 |
| Cure Chemistry | Addition | Addition | Addition |
| Cure time @ 60 C./hr | <6 | <6 | <6 |
| Recommended Cure Cond. | 60 C. - 4 hrs | 60 C. - 4 hrs | 60 C. - 4 hrs |
| Hardness/Shore A | 60 | 45 | 50 |
| Elongation/% | 220 | 249 | 459 |
| Tensile Strength/Mpa | 5.65 | 4.01 | 4.54 |
| Speed of Sound/m/s | 995 | 770 | 820 |
| Impedance/MRayls | 1.28 | 1.43 | 1.47 |
| Attenuation dB/mm @ 5 MHz | −2.9 | −5.6 | −4.1 |

*nano-particulate alpha-phase bismuth oxide

Filled silicone compositions comprising nano-particulate alpha-phase bismuth oxide having an average particle size in a range between about 90 nanometers and about 210 nanometers were evaluated and judged suitable for use in ultrasound acoustic lenses due to high filler density, relatively small effect on rheological properties of the uncured blends, and excellent acoustic attenuation performance characteristics of the cured composite compositions. Nano-particulate alpha-phase bismuth oxide has a strong impact on sound velocity. The incorporation of as little as 10 volume percent (vol %) of nano-particulate alpha-phase bismuth oxide results in about 20% reduction in the speed of sound traveling through a cured test sample prepared from a composition of the present invention. The lower speed of sound observed in the cured filled silicone compositions provided by the present invention provides additional flexibility in the design of acoustic lenses for ultrasonic probes, in that it permits the use of thinner lenses relative to a standard lens without changing the lens focal point, an effect which leads to the reduction in the lens attenuation. This effect may be accompanied, however, by the need for a higher filler level in order to achieve the desired acoustic impedance.

TABLE 9

Effect of $Bi_2O_3$ nano-particles on sound velocity in cured silicone composites

| Entry | Vol % $Bi_2O_3$ | Hardness (Shore A) | Density (g/cm3) | Sound Velocity (mm/us) | Impedance (MRayls) | Attenuation (dB/mm) | Process conditions |
|---|---|---|---|---|---|---|---|
| 1 | 4.8 | 67 | 1.643 | 0.903 | 1.48 | −3.7 | 3rollMill/Speed Mix |
| 2 | 4.8 | 67 | 1.643 | 0.913 | 1.5 | −5.1 | 3rollMill/Speed Mix |
| 3 | 7.3 | 51 | 1.632 | 0.857 | 1.398 | −3.5 | 3Roll Mill, 3 passes |
| 4 | 7.8 | 49 | 1.666 | 0.833 | 1.388 | −2.1 | 3Roll Mill, 2 passes |
| 5 | 9.4 | 49 | 1.836 | 0.811 | 1.489 | −4.7 | 3Roll Mill, 3 passes |
| 6 | 9.4 | 49 | 1.81 | 0.812 | 1.47 | −3.3 | 3Roll Mill, 3 passes |
| 7 | 9.4 | 49.4 | 1.81 | 0.82 | 1.485 | −5.3 | 3Roll Mill, 3 passes |
| 8 | 9.4 | 49.2 | 1.81 | 0.812 | 1.469 | −2.9 | 3Roll Mill, 3 passes |
| 9 | 9.4 | 49.4 | 1.81 | 0.813 | 1.472 | −3.3 | 3Roll Mill, 3 passes |
| 10 | 9.4 | 50.4 | 1.796 | 0.817 | 1.467 | −4.6 | 3Roll Mill, 3 passes |
| 11 | 9.4 | 50 | 1.796 | 0.809 | 1.453 | −3.1 | 3Roll Mill, 3 passes |
| 12 | 9.7 | 49 | 1.85 | 0.795 | 1.47 | −3.7 | 3Roll Mill, 3 passes |
| 13 | 9.8 | 49.7 | 1.823 | 0.803 | 1.46 | −3.9 | Planetary Grinder |
| 14 | 9.8 | 49.7 | 1.8 | 0.806 | 1.45 | −4 | Planetary Grinder |
| 15 | 9.8 | 49.7 | 1.816 | 0.802 | 1.46 | −4.2 | Planetary Grinder |

TABLE 9-continued

Effect of $Bi_2O_3$ nano-particles on sound velocity in cured silicone composites

| Entry | Vol % $Bi_2O_3$ | Hardness (Shore A) | Density (g/cm3) | Sound Velocity (mm/us) | Impedance (MRayls) | Attenuation (dB/mm) | Process conditions |
|---|---|---|---|---|---|---|---|
| 16 | 9.8 | 46 | 1.847 | 0.799 | 1.48 | −3.2 | Speed Mix |
| 17 | 9.9 | 49.6 | 1.79 | 0.806 | 1.44 | −4.1 | Only SpeedMix 18 hrs cure |
| 18 | 9.9 | 50.4 | 1.82 | 0.816 | 1.485 | −4.3 | Only SpeedMix 18 hrs cure |
| 19 | 9.9 | 50.2 | 1.82 | 0.819 | 1.49 | −4.6 | Only SpeedMix 18 hrs cure |
| 20 | 10.7 | 45 | 1.862 | 0.771 | 1.44 | −5.8 | Planetary Grinder |
| 21 | 10.7 | 50 | 1.861 | 0.775 | 1.44 | −4.9 | 3rollMill/ Speed Mix |
| 22 | 10.7 | 50 | 1.861 | 0.775 | 1.44 | −4.6 | 3rollMill/ Speed Mix |
| 23 | 10.7 | 50 | 1.861 | 0.782 | 1.46 | −5.2 | 3rollMill/ Speed Mix |
| 24 | 10.7 | 50 | 1.861 | 0.779 | 1.45 | −5.2 | 3rollMill/ Speed Mix |

A figure of merit (FOM) for each result given in Table 9 may be calculated by multiplying the composite attenuation by its speed of sound. The calculated FOM may be used to rank the acoustic properties of the experimental materials. In principle, the material with the lowest FOM should have the best acoustic properties for use in an acoustic lens application. In practice, however, significant variance in acoustic attenuation values may be observed. Sample variance is believed to be related to variations in process conditions which in turn produce variations in sample homogeneity and the presence at times of larger, micron size aggregates of the nano-particulate bismuth oxide.

Compositions Comprising Bismuth Oxide and Erbium Oxide

Tables 10 and 11 present data for filled silicone compositions comprising both nano-particulate monoclinic alpha-phase bismuth oxide and nano-particulate erbium oxide. The data further illustrate the performance characteristics of filled silicone compositions provided by the present invention.

TABLE 10

Wear Resistance of Filled Silicone Compositions Comprising Nano-Particulate Alpha-Phase $Bi_2O_3$ and $Er_2O_3$

| Entry | Experimental Material | Filler Composition | Filler vol % (Bi2O3 + Er2O3) | Wear/microns |
|---|---|---|---|---|
| 1 | Quartz filled 2-part silicone resin | Minusil | ~30 | 45 |
| 2 | F108-074 | 50% $Bi_2O_3$ + 50% $Er_2O_3$ | 10.2 | 7 |
| 3 | F108-080 | 28% $Bi_2O_3$ + 72% Minusil | 23.2 | 42.5 |
| 4 | F108-084 | 50% $Bi_2O_3$ + 50% $Er_2O_3$ | 10.2 | 12.5 |
| 5 | F108-088 | 100% $Bi_2O_3$ | 10.2 | 21.75 |
| 6 | F108-090 | 25% $Bi_2O_3$ + 75% $Er_2O_3$ | 10.1 | 16.25 |
| 7 | F108-091 | 62.5% $Bi_2O_3$ + 37.5% $Er_2O_3$ | 9.9 | 8.5 |
| 8 | F108-092 | 37.5% $Bi_2O_3$ + 62.5% $Er_2O_3$ | 10 | 11 |
| 9 | F108-093 | 75% $Bi_2O_3$ + 25% $Er_2O_3$ | 9.9 | 10 |
| 10 | F108-095 | 50% $Bi_2O_3$ + 50% $Er_2O_3$ | 10 | 16.5 |
| 11 | F108-096 | 50% $Bi_2O_3$ + 50% $Er_2O_3$ | 10 (Nanophase) | 16 |
| 12 | F108-099 | 50% $Bi_2O_3$ + 50% $Er_2O_3$ | 10 | — |
| 13 | F108-103 | 25% $Bi_2O_3$ + 75% $Er_2O_3$ | 10.1 | 9 |
| 14 | F108-104 | 75% $Bi_2O_3$ + 25% $Er_2O_3$ | 9.9 | 13.5 |
| 15 | F108-106A | 50% $Bi_2O_3$ + 50% $Er_2O_3$ | 8.2 | 10.5 |
| 16 | F108-106B | 50% $Bi_2O_3$ + 50% $Er_2O_3$ | 7.3 | 14.5 |
| 17 | F108-106C | 50% $Bi_2O_3$ + 50% $Er_2O_3$ | 6.5 | 6 |

TABLE 11

Physical and Acoustic Properties of Filled Silicone Compositions Comprising Nano-Particulate Alpha-Phase $Bi_2O_3$ and $Er_2O_3$

| Entry | Material Reference | Elongation % | Tensile Strength Mpa | Speed of Sound m/s | Impedance MRayls | Attenuation dB/mm |
|---|---|---|---|---|---|---|
| 1 | Quartz filled 2-part silicone resin | 218 | 5.63 | 1.000 | 1.278 | −3.104 |
| 2 | F108-074 | 352 | 4.14 | 0.791 | 1.468 | −3.984 |
| 3 | F108-080 | 195 | 4.39 | — | — | — |
| 4 | F108-084 | 344 | 4.81 | 0.805 | 1.493 | −3.568 |
| 5 | F108-088 | 275 | 4.32 | 0.786 | 1.462 | −3.625 |
| 6 | F108-090 | 326 | 5.13 | 0.815 | 1.502 | −3.566 |
| 7 | F108-091 | 289 | 4.72 | 0.807 | 1.489 | −4.600 |
| 8 | F108-092 | 366 | 5.5 | 0.809 | 1.492 | −4.476 |
| 9 | F108-093 | 295 | 4.74 | 0.796 | 1.470 | −3.832 |
| 10 | F108-095 | 321 | 4.55 | 0.813 | 1.502 | −2.678 |
| 11 | F108-096 | 300 | 4.64 | 0.811 | 1.498 | −3.504 |
| 12 | F108-099 | 307 | 4.55 | 0.806 | 1.488 | −3.541 |
| 13 | F108-103 | 298 | 4.59 | 0.806 | 1.485 | −4.010 |
| 14 | F108-104 | 258 | 4.35 | 0.778 | 1.440 | −3.600 |
| 15 | F108-106A | 300 | — | 0.805 | 1.375 | −4.040 |
| 16 | F108-106B | 289 | 4.16 | 0.818 | 1.328 | −3.764 |
| 17 | F108-106C | 294 | 4.07 | 0.828 | 1.289 | −2.621 |

The foregoing examples are merely illustrative, serving to illustrate only some of the features of the invention. The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

What is claimed is:

1. An ultrasonic probe comprising:
 (a) a substrate material;
 (b) a piezoelectric transducer; and
 (c) an acoustic lens;
 said acoustic lens comprising a filled silicone composition comprising a silicone resin and a nano-particulate monoclinic alpha-phase bismuth oxide.

2. The ultrasonic probe according to claim 1, wherein the nano-particulate alpha-phase bismuth oxide has an average particle size of from about 10 nanometers to about 200 nanometers.

3. The ultrasonic probe according to claim 1, wherein the nano-particulate alpha-phase bismuth oxide comprises from about 0.1 volume percent to about 15 volume percent of a total volume of the composition.

4. The ultrasonic probe according to claim 1, wherein said filled silicone composition further comprises nano-particulate erbium oxide.

5. The ultrasonic probe according to claim 1, wherein said filled silicone composition further comprises a pigment.

6. The ultrasonic probe according to claim 1, further comprising a pigment selected from the group consisting of carbon black, sodium aluminosulfosilicate, manganese ferrite, and iron oxide.

7. An acoustic lens comprising
 (a) a first curved surface; and
 (b) a second surface
 said acoustic lens comprising a filled silicone composition comprising a silicone resin and a nano-particulate monoclinic alpha-phase bismuth oxide.

8. An ultrasound diagnostic apparatus comprising:
 (a) an ultrasonic probe comprising (i) a substrate material, (ii) a piezoelectric transducer, and (iii) an acoustic lens comprising a filled silicone composition comprising a silicone resin and a nano-particulate alpha-phase bismuth oxide;
 (b) a signal processing unit; and
 (c) an image display.

* * * * *